(12) United States Patent
Hodgkinson et al.

(10) Patent No.: US 6,361,249 B1
(45) Date of Patent: Mar. 26, 2002

(54) NEGATIVE AIR PRESSURE COVER

(75) Inventors: Denis G. Hodgkinson, West St. Paul; Douglas D. Small, Winnipeg, both of (CA)

(73) Assignee: Samian Investments Inc., St. Andrews MB (CA)

( * ) Notice: Subject to any disclaimer, the term of this patent is extended or adjusted under 35 U.S.C. 154(b) by 0 days.

(21) Appl. No.: 09/520,983

(22) Filed: Mar. 8, 2000

(51) Int. Cl.[7] .................................................. B09B 1/00
(52) U.S. Cl. .............................. 405/129.7; 405/129.6; 405/129.9; 405/129.35; 405/65; 52/2.25; 428/69
(58) Field of Search ........................... 428/69; 220/222, 220/216, 360, 368; 454/173; 210/188; 296/63; 52/3, 2.25; 135/93, 88.16; 588/249, 261; 405/129.7, 129.6, 129.1, 65, 129.2, 129.25, 129.45, 129.35, 52, 129.9, 270; 4/498, 503

(56) References Cited

U.S. PATENT DOCUMENTS

| 3,862,876 | A | * | 1/1975 | Graves | 161/44 |
|---|---|---|---|---|---|
| 4,442,901 | A | * | 4/1984 | Zison | 166/369 |
| 4,469,176 | A | * | 9/1984 | Zison et al. | 166/250 |
| 4,590,714 | A | * | 5/1986 | Walker | 52/3 |
| 4,670,148 | A | * | 6/1987 | Schneider | 210/603 |
| 4,678,375 | A | * | 7/1987 | Gagle et al. | 405/270 |
| 5,069,693 | A | * | 12/1991 | Blikken et al. | 55/220 |
| 5,265,976 | A | * | 11/1993 | Russell | 405/52 |
| 5,431,483 | A | * | 7/1995 | Zaiger | 299/9 |
| 5,526,620 | A | * | 6/1996 | Hallsten | 52/246 |
| 5,555,877 | A | * | 9/1996 | Lockwood et al. | 126/565 |
| 5,997,071 | A | * | 12/1999 | Mazzarelli | 296/136 |

* cited by examiner

Primary Examiner—David Bagnell
Assistant Examiner—Katherine Mitchell

(57) ABSTRACT

A method for covering a lagoon, manure storage basin, waste water retention pond, water reservoir, open top material storage tank, stacks or piles of commodities, having a perimeter and a containment portion, wherein the method acquires the placement of a perforated tubular member about the perimeter, laying a resilient cover on the containment portion such that an edge of the cover is covering the tubular member and is sealed at the edge. A pumping device attached to the tabular member for extracting air through the tubular member with the pumping device which forces the cover downwardly by the use of negative air pressure.

6 Claims, 2 Drawing Sheets

NEGATIVE AIR PRESSURE COVER

The present Invention relates to a cover which uses negative air pressure to retain a synthetic cover on a manure storage basins, waste water retention ponds, water reservoirs, open top material storage tanks and as a protective covering for commodities stored in piles

BACKGROUND OF THE INVENTION

Odours from waste storage facilities are the major cause of public complaints from farm animal activities and/or other industries. Many people consider odours created by these sources offensive. For this reason new development proposals (e.g. hog operations or food processing operations) often encounter opposition. This opposition restricts the ability of producers to expand or develop livestock production facilities.

Generally, the cheapest method of handling animal manure and other forms of industrial organic waste is the use of large open storage basins with dimensions usually exceeding 150 ft by 150 ft (approximately 50 m by 50 m). Anaerobic decomposition of organic material during long retention time (180 days to greater than one year) generates obnoxious odorous compounds that escape through the large surface area of these storage facilities and cause odour problems, The problems of odours from these basins is reduced considerably through the implementation of a cover. At the present time, due to economic considerations, the use of straw for covering waste storage basins is very common. Straw coverage is relatively cheap, but is associated with some operational drawbacks Including:

a) Sinking of straw which reduces its effectiveness;
b) Straw must be reapplied each year, incurring a high annual cost,
c) Straw allows all precipitation to enter the storage;
d) Creation of problems during agitation and pump out;
e) Plugging of pump equipment; and
f) Requirement for special pumps and a pressurized delivery tank to prevent plugging of pipelines.

An alternative to straw covers is the use of synthetic covers, including those currently being used in some countries such as the Netherlands, These covers are either fixed (like a tent with a central pole) or floating, loosely connected plastic sheets. Sometimes, low profile positive air pressure has been used to support synthetic covers. Although synthetic covers do not have most of the problems associated with straw covers, their current methods of support and anchorage have generated many limitations on their use, including:

a) Fixed type covers are not recommended for structures greater than 15 m For such structures, floating covers are recommended;
b) Floating covers are not stable in windy conditions. Wind generates stresses and large forces that push the cover aside or result in tears in the material;
c) Low profile air supported covers are usually difficult to anchor, especially in high winds, Wind stresses are relatively high and tearing under high wind conditions can be severe; and
d) High costs for synthetic covers including the costs of material, anchorage, support and repair.

SUMMARY OF THE INVENTION

One objective of the invention is therefore to provide an improved cover for a lagoon or similar basin like structure.

According to one aspect of the invention there is provided a method for covering a lagoon having a perimeter and containment portion, the method comprises:

a) Placing a perforated tubular member about the perimeter,
b) Laying a resilient cover on the containment portion such that an edge of the cover is covering the tubular member;
c) Providing sealing at the perimeter of the cover by a small amount of ballasted weight;
d) Providing a pumping device, preferably a fan located outside the perimeter to extract the air:
e) Attaching the pumping device to the tubular member; and
f) extracting air through the tubular member with the pumping device which forces the cover downwardly by the use of negative air pressure, According to another aspect of the present invention there is provided a cover comprising:

a) a resilient covering sheet;
b) a perforated tubular member for location beneath the covering sheet;
c) sealing of the perimeter of the cover by use of a small amount of ballasted weight; and
d) a pumping device arranged such that, in use, air from beneath the covoring sheet is extracted through the perforated tubular member to create negative air pressure which holds the covering sheet in position.

Preferably the pumping device is a fan attached to an end of the tubular member which discharges its air outside the cover.

The perimeter of the covering sheet is sealed by use of a small amount of ballasted weight.

In order to overcome the problems associated with synthetic covers, especially those related to anchoring and retaining covers under windy conditions there is provided a cover system that applies negative air pressure as a means of the anchoring support. Negative air pressure can be applied using a simple fan and associated equipment. In order to create a negative pressure, the cover must be sealed around the perimeter. This system for sealing the perimeter of the cover can be sandbags, back filling or mechanical fasteners.

The application of negative air pressure to retain synthetic covers has many advantages including:

a) Simplicity—negative air pressure can be provided by simple inexpensive equipment such as a fan or the like;
b) Resistance of the cover to wind—due to the vacuum effect produced by negative air pressure, the cover is held tightly to the lagoon, or similar basin like structure surface. There is no chance of direct dome shaped exposure to wind, this reduces the impact of wind forces on the cover and enhances its life expectancy;
c) Ease of implementation—generally takes one day to easily implement the coverage system. There is no need for specialized equipment or highly skilled people to apply the coverage system;
d) Simplicity of the sealing system—it is relatively easy to seal the cover around the perimeter of basins or objects which are to be covered, Sealing can be provided by the use of a small amount of ballasted weight;
e) Low cost—compared to other anchoring and support methods, the total cost of the coverage system is comparable to the cost of straw covers which are generally recognized as the cheapest covers In use at the present time;

f) The use of this technology is not location specific or group specific, The technology can be used all around the world for different purposes. Potential benefactors include:
   i) Farmers, such as farm animal producers who are confronted by public opposition due to the odours from manure storage basins. The use of synthetic covers with negative air pressure would provide them with a simple/inexpensive method of odour control year round;
   ii) Industries, especially agricultural and food processing industries, that use a wastewater retention or treatment pond governed by environmental regulations related to odour and insect problems can take advantage of the technology;
   iii) Other industrial sectors that require a stable protective covering for commodities stored in piles and/or liquids stored in open top storage tanks can benefit from this technology;
   iv) The public is an indirect benefactor of the technology due to the reduction of odours, insects, flies and the improvement In their living environment; and
   v) Regulatory agencies are provided with an easy method to enforce environmental regulations. The use of a negative air pressure system to anchor synthetic cover systems provides a reliable, inexpensive method to resolve environmental concerns.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
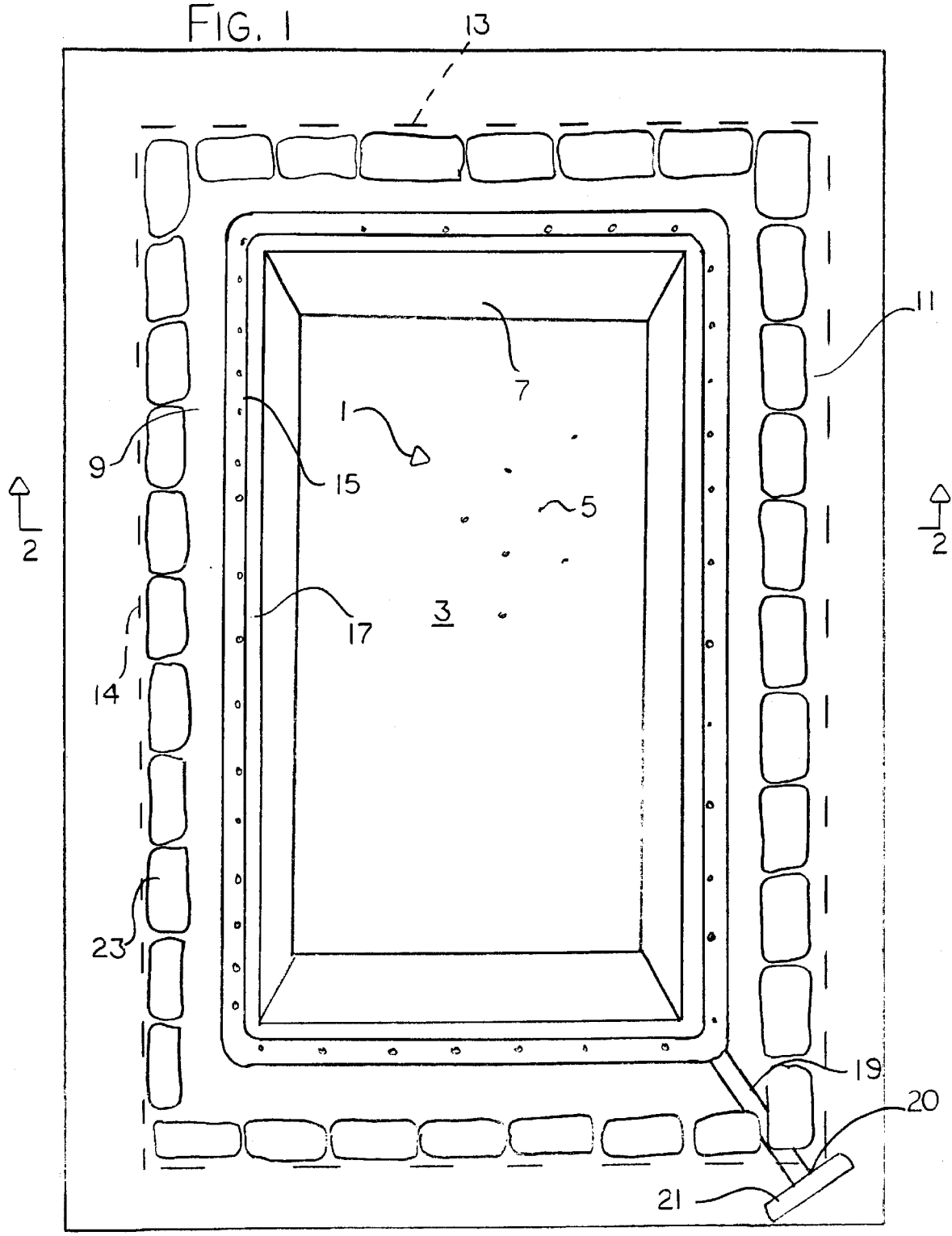
FIG. 1 is a top plan view of the present invention.

A lagoon, or similar basin like structure. 1 has a containment portion 3 arranged for storing liquids 5 such as manure, water or waste water an inner edge 7 and a top area 9 and berm 11. Odours from waste storage facilities are a major cause of public complaints from farm animal activities and/or other industries.

Many people consider odours created by these sources offensive. For this reason new development proposals (e.g. hog operations or food processing operations) often encounter opposition. This opposition restricts the ability of producers to locate activities in areas that are otherwise suitable for production. Lagoons, or similar basin like structures, of the above types are generally larger than 150 ft by 150 ft (approximately 50 m by 50 m) and containing odours is difficult. Straw and other absorbent natural materials are used but do not cover the lagoons, or similar basin like structures, adequately due to anaerobic organisms which decompose the material and create the odour.

A cover 13 for covering the lagoon 1 is made up of a resilient impermeable synthetic material such as polyethylene. The cover 13 is laid on top of the lagoon, or similar basin like structure, 1 such that the containment portion 3 is covered and an edge 14 of the cover is placed over the outer edge 9 of the lagoon or similar basin like structure.

Winds and other weather conditions cause the cover to be lifted from the lagoon or similar basin like structure. A perforated hose 15 is placed about a perimeter 17 of the berm 11 and has a hollow interior 16, The hose 15 is covered by the cover 13 and has an end 19 which extends out from beneath the cover. A pumping device 21 is attached to a manifold 20 at the end 19 of the hose 15. The pumping device 21, defining a fan or the like, is arranged to extract the air from underneath the cover 13 through the hose 15 and creates an air tight space 25 between the cover 13 and the lagoon, or similar basin like structure, 1. The extraction of air from beneath the cover 13 creates negative air pressure which forces the cover to remain on the lagoon or similar basin like structure.

Figure 2:
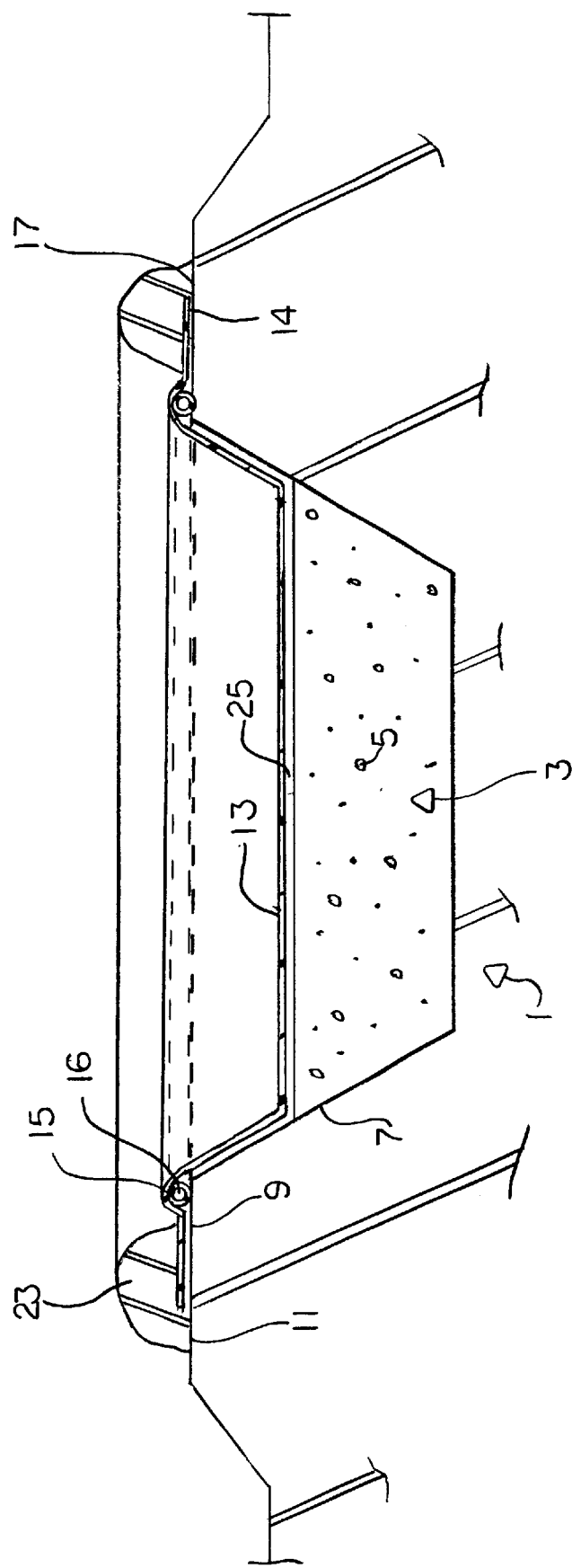
FIG. 2 is a vertical cross section along the lines 2—2 of FIG. 1 including modifications.

A sealing arrangement 23 is placed about the perimeter onto the cover such that the edge of the cover Is secure. The sealing device 23 can be sandbags, as shown, in FIG. 1, or piles of soil or back fill, as shown in FIG. 2 or burial in a small trench. The sealing arrangement is used to ensure an efficient distribution of negative air pressure under the cover.

In application, the synthetic cover is laid out over the area. The cover Is then held down by back filling local soil or placing sandbags over the perimeter of the cover. Negative air pressure is applied using a small pumping device, such as a fan, that develops a static pressure of approximately one quarter to one and one half inch water column. The fan is connected to the perforated hose placed beneath the cover. Air is drawn from beneath the cover, causing the cover to cling to the surface.

Since various modifications can be made in the invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. A method for covering a lagoon manure storage basin, waste water retention pond, water reservoir, open top material storage tank, or stacks or piles having a perimeter and a containment portion, the method comprises;
   placing a perforated tubular member about the perimeter of a lagoon, manure storage basin, waste water retention pond, water reservoir, open top material storage tank, or stacks or piles of commodities;
   laying a resilient cover on the containment portion lagoon, manure storage basin, waste water retention pond, water reservoir, open top material storage tank, or stacks or piles of commodities, such that the perimeter of the cover is covering the tubular member;
   sealing the perimeter of the cover with a small amount of ballasted weight;
   providing a pumping device;
   attaching the pumping device to the tubular member;
   and extracting air through the tubular member with the pumping device which forces the cover downward by the use of negative air pressure.

2. The method according to claim 1 wherein the pumping device is a fan located outside the perimeter to extract the air.

3. The method according to claim 1 wherein the perimeter of the cover sheet is sealed by use of a small amount of ballasted weight.

4. A lagoon, manure storage basin, waste water retention pond, water reservoir, open top material storage tank, or stacks or piles of commodities cover comprising:
   a resilient lagoon, manure storage basin, waste water retention pond, water reservoir, open top material storage tank, or stacks or piles of commodities covering sheet;

a perforated tubular member for location beneath the covering sheet;

sealing of the perimeter of the covering sheet by use of a small amount of ballasted weight;

and a pumping device arranged such that, in use, air from beneath the covering sheet is oxtracted through the perforated hose to create negative air pressure which holds the covering sheet in position over a lagoon, manure storage basin, waste water retention pond, water reservoir, open top material storage tank, or stacks or piles of commodities.

5. The cover according to claim 4 wherein the pumping device is a fan for attachment to an end of the tubular member which discharges its air outside the cover.

6. The cover according to claim 4 wherein a small amount of ballasted weight is used to seal the perimeter of the cover sheet.

* * * * *